United States Patent [19]

Harris et al.

[11] Patent Number: 4,640,065

[45] Date of Patent: Feb. 3, 1987

[54] STRUCTURAL MEMBER

[75] Inventors: Ronald R. Harris; Russell L. Ault, both of Newark, Ohio

[73] Assignee: Owens-Corning Fiberglas Corporation, Toledo, Ohio

[21] Appl. No.: 785,192

[22] Filed: Oct. 7, 1985

[51] Int. Cl.$^4$ .......................... E06B 1/04; E04C 1/00
[52] U.S. Cl. ........................... 52/204; 52/207; 52/309.1; 52/309.4; 52/309.14
[58] Field of Search ............ 52/204, 207, 309.1, 52/309.4, 309.14, 731, 727; 428/74, 76; 49/475, 501, 504, DIG. 1, DIG. 2; 403/364

[56] References Cited

U.S. PATENT DOCUMENTS

| | | | |
|---|---|---|---|
| 1,214,185 | 1/1917 | Krieger | 428/76 |
| 2,120,783 | 6/1938 | Hoffman | 49/DIG. 2 |
| 2,782,465 | 2/1957 | Palmer | 428/74 |
| 2,948,649 | 8/1960 | Pancherz | 156/186 |
| 3,087,207 | 4/1963 | Styra | 52/204 |
| 3,262,723 | 7/1966 | Strickler | 403/364 |
| 3,448,489 | 6/1969 | Boggs | 264/170 |
| 3,518,157 | 6/1970 | Terry et al. | 264/119 |
| 3,574,104 | 4/1971 | Medler | 52/727 |
| 3,692,340 | 9/1972 | Roth | 52/726 |
| 3,783,066 | 1/1974 | Myers | 156/161 |
| 3,922,425 | 11/1975 | Plumberg | 52/309.14 |
| 4,057,936 | 11/1977 | Wyatt et al. | 52/731 |
| 4,463,043 | 7/1984 | Reeves et al. | 428/76 |
| 4,553,364 | 11/1985 | Legg et al. | 49/DIG. 2 |

FOREIGN PATENT DOCUMENTS

| | | | |
|---|---|---|---|
| 1659430 | 8/1967 | Fed. Rep. of Germany | 49/DIG. 1 |
| 40410 | 4/1907 | Switzerland | 52/660 |

Primary Examiner—James L. Ridgill, Jr.
Attorney, Agent, or Firm—Ronald C. Hudgens; Ted C. Gillespie; Paul J. Rose

[57] ABSTRACT

Core material of shaped glass fiber board is impregnated with resin in outer surface portions, the resin is cured, an additional resin casing is formed therearound, and the additional resin is cured. Glass strands may be included with the resin impregnation, and a continuous strand mat, a veil mat, and glass rovings may be included with the resin encasing.

24 Claims, 14 Drawing Figures

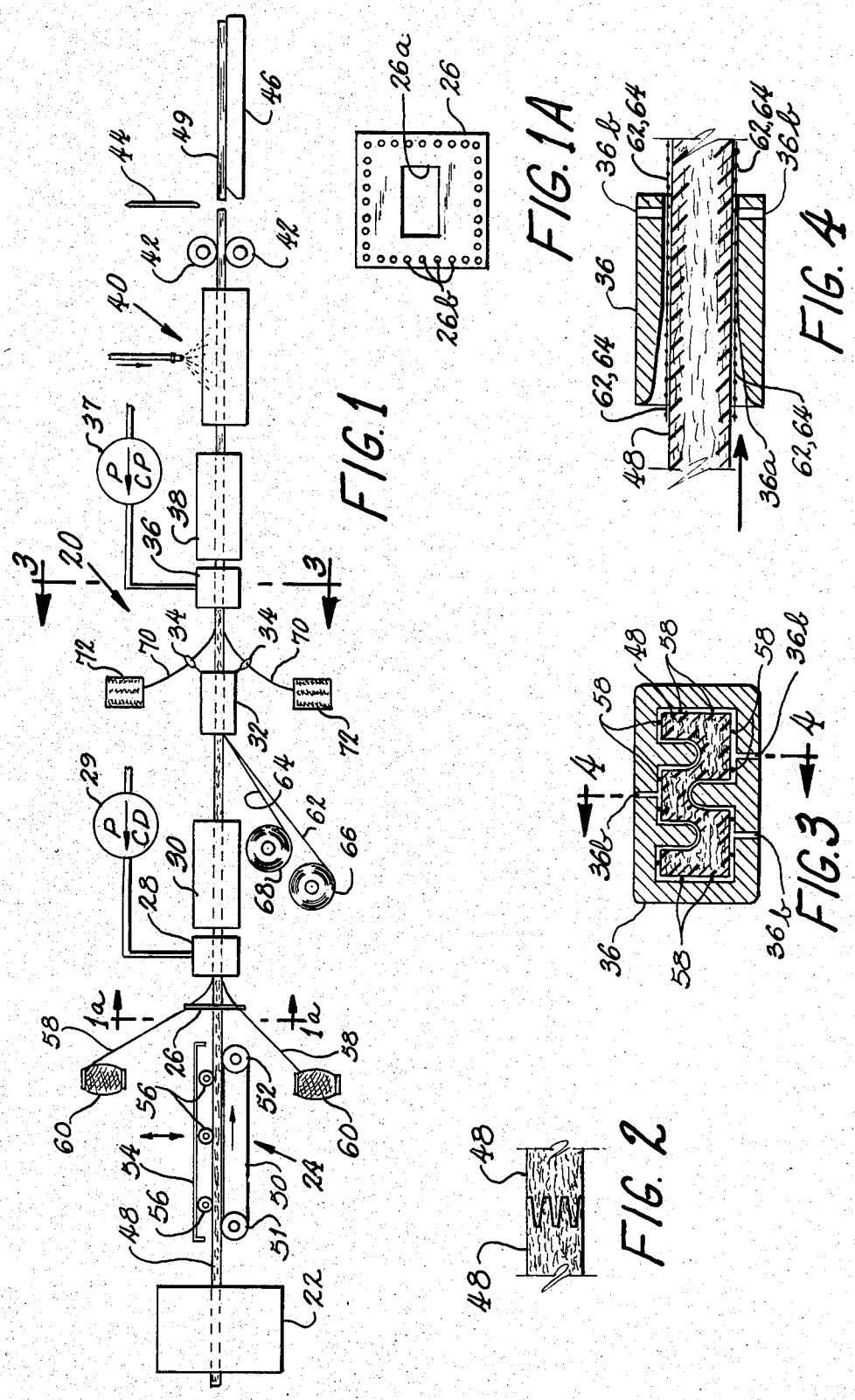

STRUCTURAL MEMBER

TECHNICAL FIELD

This invention relates generally to building components, and more particularly to structural members having relatively low thermal conductivity.

BACKGROUND ART

U.S. Pat. No. 3,518,157 discloses a pultrusion process for making molded glass wool products of a non-structural nature. U.S. Pat. Nos. 2,948,649, 3,448,489, and 3,783,066 disclose pultrusion processes for making glass fiber reinforced plastic structural members having relatively high thermal conductivity.

DISCLOSURE OF INVENTION

In accordance with the invention, a pultrusion process is disclosed for making fibrous glass structural members having relatively low thermal conductivity.

BRIEF DESCRIPTION OF DRAWINGS

The invention is more fully explained hereinafter, reference being had to the accompanying drawings wherein:

FIG. 1 is a schematic elevational view illustrating apparatus for making structural members in accordance with the invention;

FIG. 1A is an elevational view taken generally along the line 1A—1A of FIG. 1;

FIG. 2 shows a joint between two successive fibrous glass members fed into the apparatus of FIG. 1;

FIG. 3 is a cross-sectional view taken generally along the line 3—3 of FIG. 1 and illustrating a resin-impregnated fibrous glass member in a resin-encasing die;

FIG. 4 is a longitudinal sectional view taken generally along the line 4—4 of FIG. 3;

BEST MODE OF CARRYING OUT THE INVENTION

Figure 5:
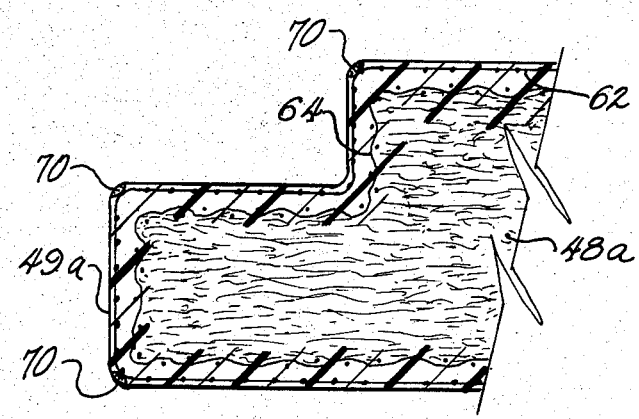
FIG. 5 is an enlarged fragmentary sectional view of a differently shaped fibrous glass structural member constructed in accordance with the invention.
Figure 6:
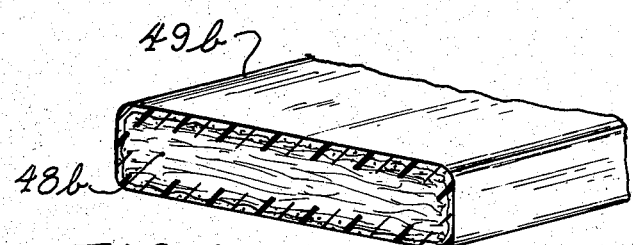
FIGS. 6, 7 and 8 are fragmentary isometric views, partly in section, illustrating other shapes of fibrous glass structural members constructed in accordance with the invention.
Figure 7:
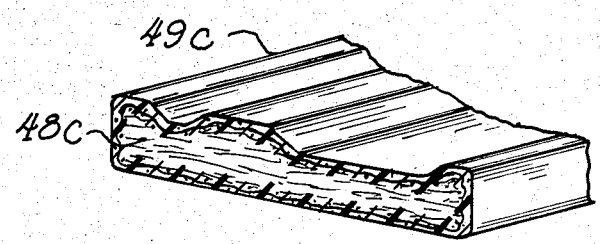
Figure 8:
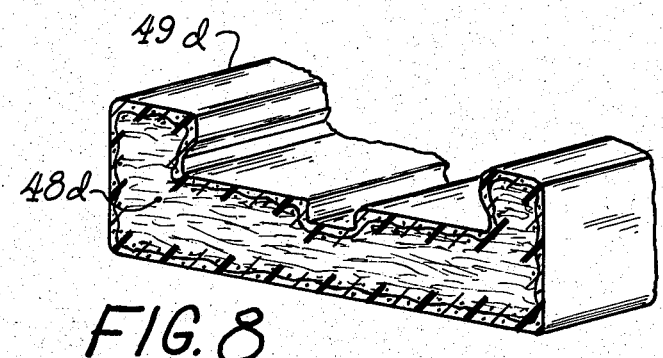

With reference to the drawings, FIG. 1 illustrates apparatus 20 for carrying out the process of the invention, the apparatus including a shaper 22, a driving belt mechanism 24, a strand guide 26, a resin-impregnating die 28 supplied with resin by a constant delivery pump 29, a resin curing box 30 supplied with hot air, a mat forming shoe 32 with attached roving guide eyes 34, a resin-encasing die 36 supplied with resin by a constant pressure pump 37, an electrically heated resin curing die 38, a cooling device 40, a pair of pulling rolls 42, a travelling cut-off saw 44, and a support table 46. It is within the scope of the invention for the shaper 22 to be off-line and for the driving belt mechanism 24 to be omitted.

Core material for a structural member of the invention is originally formed as a glass fiber board including glass wool impregnated with about 20% or less, suitably 14%, by weight of a phenolic resin binder such as phenol-urea-formaldehyde and molded and cured to a density of less than 20 pounds per cubic foot, suitably 6 to 8 pounds per cubic foot, and to an appropriate thickness. The board is appropriately grooved at opposite ends and slit into core pieces 48 of appropriate rectangular cross section. The shaper 22 removes portions of the core pieces 48 to provide an appropriately shaped cross section such as that shown therefor in FIG. 3. The grooved ends of successive core pieces 48 mate together as shown in FIG. 2.

The driving belt mechanism 24 includes an endless lower belt 50 driven around a pair of rolls 51 and 52 and disposed beneath core pieces 48 discharged from the shaper 22, and an upper frame 54 having a plurality of rolls 56 rotatably supported thereon and vertically adjustable therewith for applying pressure to the upper surfaces of core pieces 48.

The strand guide 26 is more clearly shown in FIG. 1A and consists of a rectangular plate having a central aperture 26a for receiving core pieces 48 and a plurality of holes 26b for guiding reinforcing strands 58, preferably of glass fiber, from supply spools such as spools 60 in FIG. 1, into peripherally encompassing longitudinally extending relationship with core pieces 48, as indicated in the die 36 in FIG. 3, before entry thereof into the impregnating die 28.

The resin-impregnating die 28, not shown in detail, has a central passageway extending therethrough, shaped as shown in FIG. 3 for the resin-encasing die 36, for receiving core pieces 48. Several passageways transverse to the central passageway meter highly filled polyester resin, formulated without release agents, from the constant delivery pump 29 to the core pieces 48 to provide a uniform thickness of resin impregnation in outer surface portions thereof all around a cross section thereof and all along the length thereof. The resin thus impregnated is cured as the core pieces 48 pass through the curing box 30 to provide an essentially non-porous, tacky, somewhat rough surface on the core pieces. The curing box 30 is provided with inlet and outlet ducts (not shown) for passage of hot air therethrough to effect the curing of the resin.

Finish mat 62, preferably a polyester veil, and reinforcing mat 64, preferably continuous glass strand mat, are pulled respectively from supply rolls 66 and 68 into the forming shoe 32 along with core pieces 48. The forming shoe 32 progressively wraps the mats 62 and 64 around the core pieces 48 with an overlap at mating opposite edges. Glass rovings 70 from supply packages such as packages 72 shown in FIG. 1 are pulled through the guide eyes 34 to extend along the core pieces 48 on the outside of the mat 62 for filling out and reinforcing outside corner portions. FIGS. 5, 6, 7 and 8 show differently shaped core pieces 48a, 48b, 48c, and 48d in composite structural members 49a, 49b, 49c, and 49d. The rovings 70 are shown schematically in FIG. 5. Alternatively, the rovings 70 may be disposed inside the mats 62 and 64.

The core pieces 48 with the strands 58, mat 64, mat 62, and rovings 70 pass through the resin-encasing die 36 wherein the mat 64, mat 62, and rovings 70 are impregnated with resin. The die 36 is best shown in FIGS. 3 and 4. A central passageway 36a extends therethrough for receiving the core pieces 48 along with the mats and rovings. The passageway 36a is tapered at its upstream end and is generally shaped correspondingly to a cross section of the core pieces 48. Several transversely extending passageways 36b are provided for supplying polyester resin from the constant pressure pump 37. The resin applied in the die 36 is cured in the curing die 38, which also determines the final size of the composite member, to provide a casing around the previously impregnated core pieces 48, the casing having a high-quality, void-free surface finish and being reinforced by the mats 62 and 64 and the rovings 70. The composite lineal structural member 49 is cooled by a spray of water in the device 40. The pulling rolls 42 are exemplary. In actual practice, upper and lower endless conveyor chains carrying movable flights with resilient pads are provided. The composite lineal structural member 49 is cut to desired length by the travelling saw 44 and deposited on the table 46.

Figure 9:
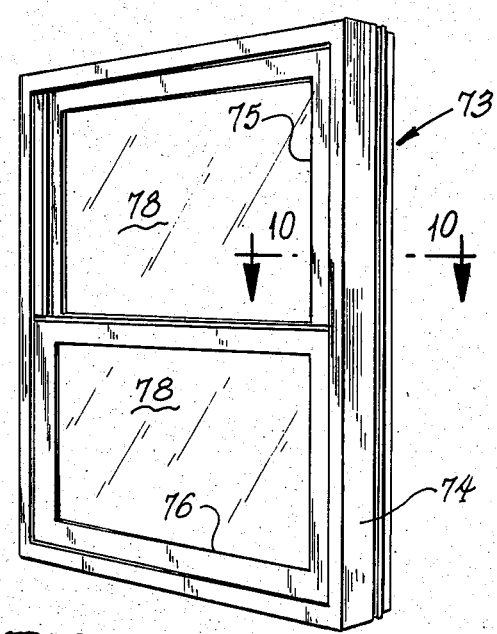
FIG. 9 an elevational perspective view of a double-hung window frame and sash constructed of fibrous glass structural members made in accordance with the invention.
Figure 10:
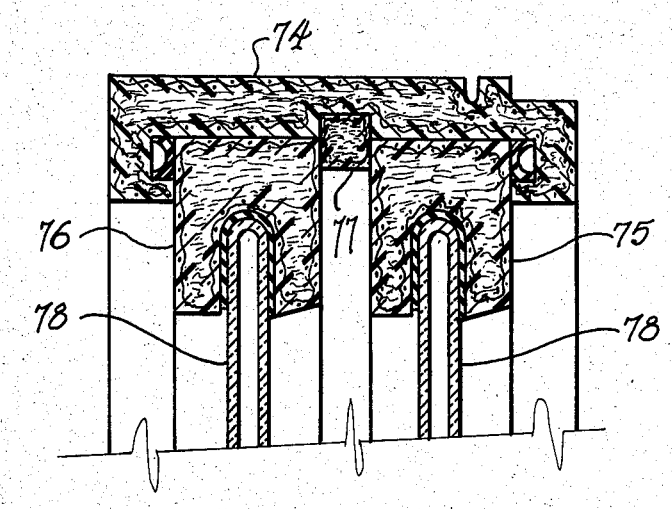
FIG. 10 is an enlarged sectional view taken generally along the line 10—10 of FIG. 9.

FIGS. 9 and 10 illustrate a double-hung window 73 including a frame 74 and upper and lower window sashes 75 and 76 constructed of lineal structural members made in accordance with the invention and including a spacing strip 77. Each of the frame 74 and the sashes 75 and 76 has straight top, bottom, and opposite side members. Each of the sashes 75 and 76 is shown with an insulating glass unit 78, although removable double glazing may be used instead.

The glass fiber board from which the core pieces 48 are made is generally laminar, and the resin applied in the impregnating die such as the die 28 tends to penetrate deeper into a core piece in directions parallel to the laminations and shallower in directions perpendicular to the laminations. This makes it difficult to provide a uniform thickness of resin impregnation all around the periphery of a core piece, as was previously said to be provided in the resin-impregnating die 28.

Figure 11:
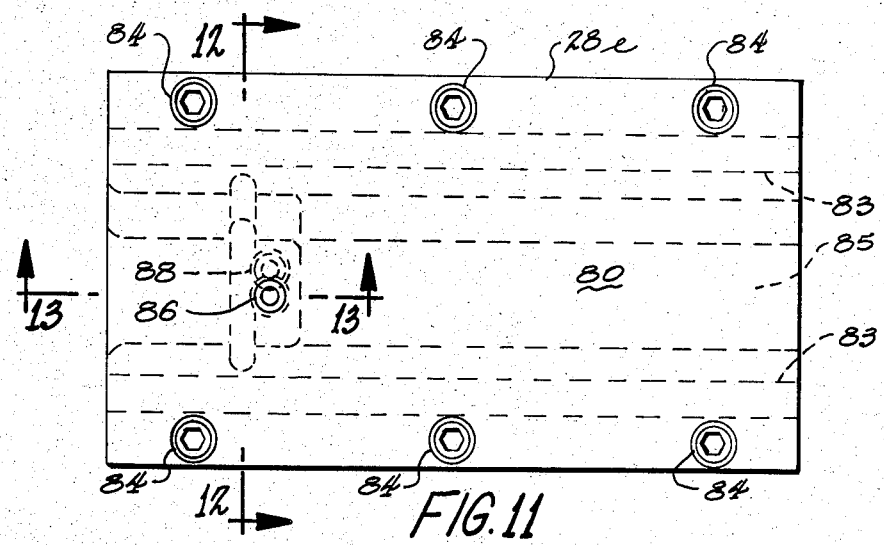
FIG. 11 is a top view of a resin-impregnating die similar to that of FIG. 1, but shaped to accommodate a structural member such as shown in FIG. 14.
Figures 12, 14:
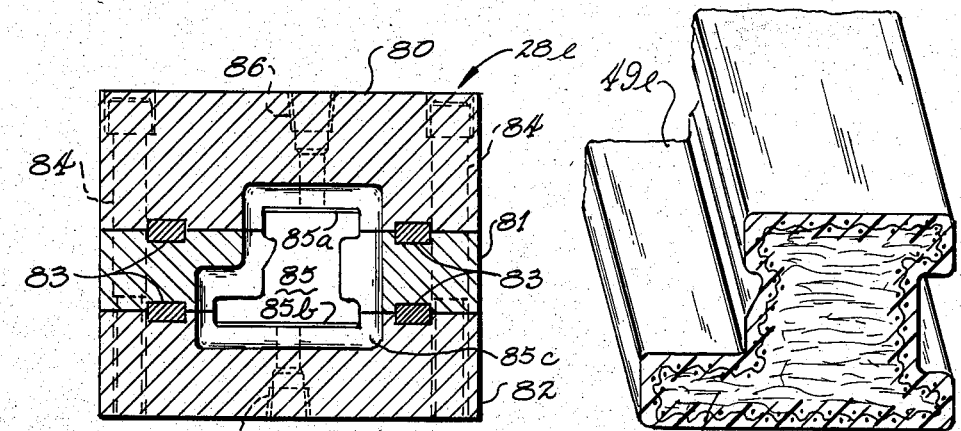
FIG. 12 is a sectional view taken generally along the line 12—12 of FIG. 11.
FIG. 14 is a fragmentary isometric view, partially in section and enlarged from the scale of FIGS. 11-13, of a structural member constructed in accordance with the invention using the die of FIGS. 11-13.
Figure 13:
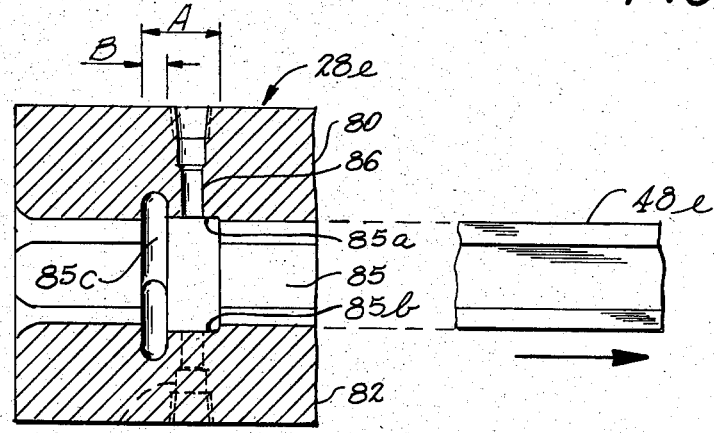
FIG. 13 is a fragmentary sectional view taken generally along the line 13—13 of FIG. 11 and showing a fragmentary representation of the structural member of FIG. 14 exiting from the die.

FIG. 14 shows a differently shaped core piece 48e in a composite structural member 49e, and FIGS. 11–13 show a die 28e uniquely constructed to effect the uniform thickness of resin impregnation into the core piece 48e all around its periphery. The die 28e includes three main parts, namely, an upper portion 80, an intermediate portion 81, and a lower portion 82 aligned by a plurality of keys 83 and secured together by a plurality of screws 84. The divisions between the die portions 80, 81, and 82 are omitted in FIG. 13 to reduce the number of horizontal lines. The composite die 28e is provided with a passageway 85 extending longitudinally therethrough and having a cross-sectional shape, for the greater portion of its length, corresponding to that of the core piece 48e.

The upper portion 80 of the die 28e is provided with an inlet passageway 86 for feeding resin to an upper surface of a core piece 48e passing through the passageway 85, and the lower portion 82 is provided with an inlet passageway 88 for feeding resin to a lower surface of the core piece. FIG. 13 shows a portion of a core piece which has passed through the die. The passageway 85 is enlarged in two different aspects. First, the upper die portion 80 is recessed as at 85a and the lower die portion 82 is recessed as at 85b, and secondly, the three die portions 80, 81, and 82 are grooved to provide an inner peripheral groove 85c disposed upstream of the recesses 85a and 85b and extending all around a core piece 48e passing through the die. The groove 85c acts as a reservoir for resin. Resin pumped through inlet passageway 86 flows under pressure to the groove 85c through the recess 85a and resin pumped through inlet passageway 88 flows under pressure to the groove 85c through the recess 85b even when a core piece 48e is in the passageway 85. The velocity of the core pieces 48e through the passageway 85, to the right as viewed in FIGS. 11 and 13, is maintained sufficiently high to retain resin in the groove 85c and prevent resin from flowing out the inlet end of the passageway 85 (the left end as viewed in FIGS. 11 and 13). Further, the length of the die 28e downstream of the resin inlets 86 and 88 is sufficiently great that by the time a core piece 48e emerges, the resin thereon has soaked thereinto sufficiently so as not to drip off. Thus, no drip pans need be provided to catch resin and circulate it back through the system, and the atmosphere around the apparatus 20 is less polluted with resin.

As a core piece 48e is passing through the die 28e, at any given instant it is exposed to resin on its top and bottom surfaces over a distance A indicated in FIG. 13. The side surfaces of the core piece 48e fit the passageway 85 snugly enough that at any given instant, they are exposed to resin over a lesser distance B indicated in FIG. 13, i.e., essentially only at the groove 85c. Therefore, the slower penetration of resin into the top and bottom surfaces is compensated by their larger area exposed to the resin application at any given instant, and a uniform thickness of resin impregnation all around the core piece 48e is obtained in spite of the laminar structure thereof. This is important, because the resin impregnation must result in an essentially non-porous surface to prevent flooding into the core piece by the subsequently applied encasing resin, which is applied under pressure. Flooding of the interior of the core by the encasing resin would diminish the high insulation value of the core.

Various modifications may be made in the structure shown and described without departing from the spirit and scope of the invention as set forth in the following claims.

We claim:

1. A lineal structural member comprising an elongate glass wool core particularly formed as one of a plurality of cores provided by the cutting of an elongate binder-containing glass wool board of predetermined thickness longitudinally into a plurality of glass wool cores of a predetermined cross-sectional size, said core having outer longitudinal portions removed to provide the core with a predetermined cross-sectional shape, outer surface portions all the way around the periphery of the core being impregnated with a hardenable liquid resin in addition to the binder and the resin being cured, and a separately applied and cured hardenable liquid resin casing surrounding and being integral with and bonded to the resin-impregnated outer surface portions of the core.

2. A lineal structural member as claimed in claim 1 including a reinforcing mat in the resin casing.

3. A lineal structural member as claimed in claim 2 wherein the reinforcing mat is a continuous glass strand mat.

4. A lineal structural member as claimed in claim 1 including a finish mat in an outer surface portion of the resin casing.

5. A lineal structural member as claimed in claim 4 including a reinforcing mat in the resin casing inside the finish mat.

6. A lineal structure member as claimed in claim 5 wherein the reinforcing mat is a continuous glass strand mat.

7. A window comprising a generally rectangular frame and a generally rectangular sash therein, the frame and sash each having straight top, bottom, and opposite side members, each of said members including an elongate glass wool core particularly formed as one of a plurality of cores provided by the cutting of an elongate binder-containing glass wool board of predetermined thickness longitudinally into a plurality of glass wool cores of a predetermined cross-sectional size, said core having outer longitudinal portions removed to provide the core with a predetermined cross-sectional shape, outer surface portions all the way around the periphery of the core being impregnated with a hardenable liquid resin in addition to the binder and the resin being cured, and a separately applied and cured hardenable liquid resin casing surrounding and being integral with the bonded to the resin-impregnated outer surface portions of the core.

8. A window as claimed in claim 7 wherein each of said members includes a reinforcing mat in the resin casing.

9. A window as claimed in claim 8 wherein the reinforcing mat is a continuous glass strand mat.

10. A window as claimed in claim 7 wherein each of said members includes a finish mat in an outer surface portion of the resin casing.

11. A window as claimed in claim 10 wherein each of said members includes a reinforcing mat in the resin casing inside the finish mat.

12. A window as claimed in claim 11 wherein the reinforcing mat is a continuous glass strand mat.

13. A window sash comprising straight top, bottom, and opposite side members, each of said members including an elongate glass wool core particularly formed as one of a plurality of cores provided by the cutting of an elongate binder-containing glass wool board of predetermined thickness longitudinally into a plurality of glass wool cores of a predetermined cross-sectional size, said core having outer longitudinal portions removed to provide the core with a predetermined cross-sectional shape, outer surface portions all the way around the periphery of the core being impregnated with a hardenable liquid resin in addition to the binder and ther resin being cured, and a separately applied and cured hardenable liquid resin casing surrounding and being integral with and bonded to the resin-impregnated outer surface portions of the core.

14. A window sash as claimed in claim 13 wherein each of the members includes a reinforcing mat in the resin casing.

15. A window sash as claimed in claim 14 wherein the reinforcing mat is a continuous glass strand mat.

16. A window sash as claimed in claim 13 wherein each of the members includes a finish mat in an outer surface portion of the resin casing.

17. A window sash as claimed in claim 16 wherein each of the members includes a reinforcing mat in the resin casing inside the finish mat.

18. A window sash as claimed in claim 17 wherein the reinforcing mat is a continuous glass strand mat.

19. A window frame comprising straight top, bottom, and opposite side members, each of said members including an elongated glass wool core particularly formed as one of a plurality of cores provided by the cutting of an elongate binder-containing glass wool board of predetermined thickness longitudinally into a plurality of glass wool cores of a predetermined cross-sectional size, said core having outer longitudinal portions removed to provide the core with a predetermined cross-sectional shape, outer surface portions all the way around the periphery of the core being impregnated with a hardenable liquid polyester resin in addition to the binder and the resin being cured, and a separately applied and cured hardenable liquid polyester resin casing surrounding and being integral with and bonded to the polyester resin-impregrnated outer surface portions of the core.

20. A window frame as claimed in claim 19 wherein each of said members includes a reinforcing mat in the polyester resin casing.

21. A window frame as claimed in claim 20 wherein the reinforcing mat is a continuous strand mat.

22. A window frame as claimed in claim 19 wherein each of said members include a finish mat in an outer surface portion of the polyester resin casing.

23. A window frame as claimed in claim 22 wherein each of said members includes a reinforcing mat in the polyester resin casing inside the finish mat.

24. A window frame as claimed in claim 23 wherein the reinforcing mat is a continuous strand mat.

* * * * *